June 8, 1926.
W. E. HORNER
CLAMP
Original Filed July 20, 1925
1,588,369
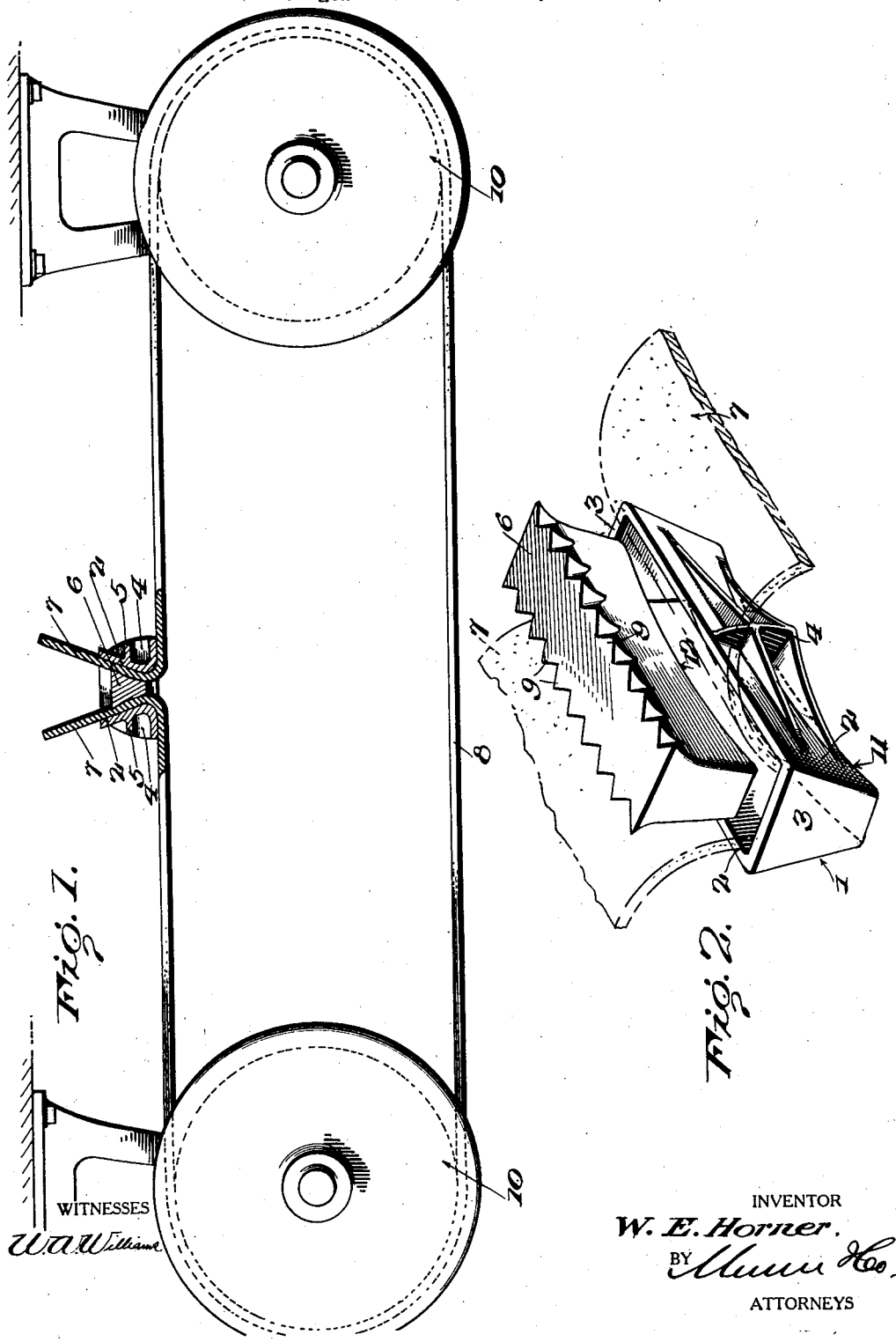
INVENTOR
W. E. Horner.
BY
ATTORNEYS Patented June 8, 1926.

1,588,369

UNITED STATES PATENT OFFICE.

WILLIAM ELMER HORNER, OF TONKAWA, OKLAHOMA.

CLAMP.

Original application filed July 20, 1925, Serial No. 44,819. Divided and this application filed September 15, 1925. Serial No. 56,533.

The present invention is an improvement in clamping devices for coupling or fastening the ends of a belt, and it consists in the combinations, constructions and arrangements herein described and claimed.

The present invention is a divisional part of that which is disclosed in my prior application for patent for belt tighteners and couplers, filed July 20th, 1925, Serial #44,819.

An object of the present invention is the provision of a simple, reliable and easily adjusted fastening device which affords facilities for connecting the ends of a belt so that the belt will be kept desirably taut without any projecting elements being placed at the inner side of the belt or in position to contact with a pulley on which the belt may travel.

Other objects and advantages of the invention will be apparent from the following description, considered in connection with the accompanying drawings, in which—

Figure 1 is a view, mainly in side elevation, and partly in vertical section, showing the improved coupler applied to the ends of a belt which is trained about a pair of spaced pulleys, and Figure 2 is a perspective view of the coupler showing the holding member of the coupler raised from active position and showing in dash lines the ends of the belt in position to be coupled together by means of said coupler.

The improved coupler comprises a hollow body or frame generally designated 1 which consists of a pair of side members 2 and a pair of end members 3 joined to each other integrally or otherwise and so formed and arranged as to produce a space within the body open at both the upper and lower ends of the body. This space decreases uniformly in width from its upper end to its lower end. The sides 2 of the coupler body may be reinforced by web structures on the outer faces thereof, such as indicated at 4. Such web structures include laterally extending members 5 which extend longitudinally of the coupler body and are adapted to serve as handles for the coupler body. A wedge-shaped holding member 6 is adapted to fit in the body of the coupler to cooperate with the side walls of the coupler body to prevent withdrawal of the ends 7 of a belt 8 when the ends of the belt have been extended through the space within the coupler body from the lower end of the latter between the side walls of the body of the coupler and the holding member 6. The wedge-shaped holding member 6 decreases in width from its upper end to its lower end and has laterally extending teeth 9 at its upper end adapted to bite into the end portions of the belt and thus securely hold the end portions of the belt against slipping downward in the coupler when the holding member 6 is in position to clamp the ends of the belt against the side walls of the body of the coupler, as illustrated in Figure 1. It will be observed that any pull on the end portions of the belt, tending to withdraw such end portions of the belt from the space within the body of the coupler, will tend to tighten the holding member 6 against the end portions of the belt which extend between the holding member and the sides of the coupler body. It therefore is manifest that the end portions of the belt will be firmly and securely fastened to the coupler body and the belt will be maintained desirably taut when the end portions of the belt are connected by the coupler in the manner described. The coupler will be disposed at the outer side of the belt and therefore can travel with the belt about the periphery of pulleys such as indicated at 10 in Figure 1 of the drawings, without contacting the peripheral surfaces of the pulleys. If desired, the lower surfaces of the coupler body 1 and the holding member 6 may be concavely curved longitudinally thereof as indicated at 11 and 12 respectively to conform to the convex curvature of the peripheral surface of a pulley over which the belt with which the coupler is associated may travel. It also will be noted that the coupled together portions of the belt do not overlap but may move in the same plane. Therefore, no obstructions are provided at the inner side of the belt which would tend to cause undue wear on the belt as the belt moves in contact with a pulley or would tend to interfere with the movement of the belt about the periphery of a pulley.

Obviously, the invention is susceptible of embodiment in forms other than that which is illustrated in the accompanying drawing, and I therefore consider as my own all such modifications and adaptations thereof as fairly fall within the scope of the appended claim.

I claim:—

In a device of the character described, a belt tightener comprising a body having a pair of spaced side members and a pair of end members rigid with one another, said body having a space therewithin open at its upper and lower edges, tapering in width from its upper end to its lower end, and a wedge-shaped holding member movable to and from position within said body to cooperate with the side members of said body to retain the ends of a belt against downward movement in said body, and reinforcing web structures on the outer faces of said side members of the body of the coupler, said web structures being adapted to serve as handles for the body of the coupler.

WILLIAM ELMER HORNER.